US012629823B2

(12) United States Patent
Romeres et al.

(10) Patent No.: US 12,629,823 B2
(45) Date of Patent: *May 19, 2026

(54) SYSTEM AND METHOD FOR CONTROLLING A MECHANICAL SYSTEM WITH MULTIPLE DEGREES OF FREEDOM

(71) Applicant: Mitsubishi Electric Research Laboratories, Inc., Cambridge, MA (US)

(72) Inventors: Diego Romeres, Boston, MA (US); Alberto Dalla Libera, Padua (IT); Giulio Giacomuzzo, Padua (IT); Ruggero Carli, Padua (IT)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/222,540

(22) Filed: Jul. 17, 2023

(65) Prior Publication Data

US 2024/0391095 A1 Nov. 28, 2024

Related U.S. Application Data

(60) Provisional application No. 63/469,002, filed on May 25, 2023.

(51) Int. Cl.
*B25J 9/16* (2006.01)

(52) U.S. Cl.
CPC ............. *B25J 9/163* (2013.01); *B25J 9/1607* (2013.01); *B25J 9/161* (2013.01); *B25J 9/1633* (2013.01); *B25J 9/1653* (2013.01); *B25J 9/1664* (2013.01)

(58) Field of Classification Search
CPC . B25J 9/163; B25J 9/1607; B25J 9/161; B25J 9/1633; B25J 9/1653; B25J 9/1664;
(Continued)

(56) References Cited

U.S. PATENT DOCUMENTS

2003/0208302 A1* 11/2003 Lemelson .............. G05B 19/19
700/245
2021/0397955 A1* 12/2021 Kandemir ............ G05B 13/027
(Continued)

OTHER PUBLICATIONS

He et al., "Minimum Energy Trajectory Optimization for Driving Systems of Palletizing Robot Joints," Dec. 3, 2018 (Year: 2018).*
(Continued)

*Primary Examiner* — Adam R Mott
*Assistant Examiner* — Byron Xavier Kasper
(74) *Attorney, Agent, or Firm* — Gene Vinokur

(57) ABSTRACT

The present disclosure discloses a system and a method for controlling a mechanical system having different actuators and multiple degrees of freedom to track a reference trajectory for performing a task. The system comprises a memory configured to store an energy based inverse dynamics model trained with machine learning to map states of the different actuators to corresponding torques for the different actuators, wherein the energy based inverse dynamics model is configured to model energy of the mechanical system with a Gaussian Processes Regression (GPR) process having a matrix capturing correlations between the torques of the different actuators. The system further comprises a processor configured to process the states of the different actuators with the energy based inverse dynamics model to produce values of the torques for the different actuators of the mechanical system, and control the mechanical system based on the produced values of the torques.

21 Claims, 12 Drawing Sheets

(58) Field of Classification Search
CPC .... B25J 9/00; B25J 9/16; B25J 13/085; B25L 9/1661; G05B 19/00; H02P 6/08; H02P 8/14
See application file for complete search history.

(56) References Cited

U.S. PATENT DOCUMENTS

| | | | |
|---|---|---|---|
| 2023/0288931 A1* | 9/2023 | Wang | B25J 5/007 |
| 2024/0066692 A1* | 2/2024 | Reuss | B25J 9/1633 |
| 2024/0103490 A1* | 3/2024 | Hoffman | B25J 9/1664 |

OTHER PUBLICATIONS

Xu et al., "Multi-Input Multi-Output Adaptive Torque Control of 9-DOF Hyper-Redundant Robotic Arm," 2016 (Year: 2016).*
Bonin, "DE 102010033248 A1," Jan. 19, 2012 (Year: 2012).*
Nguyen et al., "Learning Robot Dynamics for Computed Torque Control using Local Gaussian Processes Regression," 2008 (Year: 2008).*
Romeres et al., "Online semi-parametric learning for inverse dynamics modeling," Oct. 9, 2016 (Year: 2016).*
C. Gaz, M. Cognetti, A. Oliva, P. Robuffo Giordano, and A. De Luca, "Dynamic identification of the franka emika panda robot with retrieval of feasible parameters using penalty-based optimization," IEEE Robotics and Automation Letters, vol. 4, No. 4, pp. 4147-4154, 2019.
D. Romeres, M. Zorzi, R. Camoriano, and A. Chiuso, "Online semi-parametric learning for inverse dynamics modeling," in 2016 IEEE 55th Conference on Decision and Control (CDC). IEEE, 2016, pp. 2945-2950.
M. Lutter, C. Ritter, and J. Peters, "Deep lagrangian networks: Using physics as model prior for deep learning," in 7th International Conference on Learning Representations (ICLR). ICLR, May 2019.
C.-A. Cheng, H.-P. Huang, H.-K. Hsu, W.-Z. Lai, and C.-C. Cheng, "Learning the inverse dynamics of robotic manipulators in structured reproducing kernel hilbert space," IEEE Transactions on Cybernetics, vol. 46, No. 7, pp. 1691-1703, 2016.

* cited by examiner

200

201 Define a Lagrangian function that describes the mechanical system in terms of kinetic energy and potential energy 203 Define the kinetic energy and the potential energy as Gaussian Processes 205 Define a Lagranian operator that maps the Lagrangian function to torques

A

401 Compute a covariance between the kinetic energy and the torques

403 Compute a probabilistic posterior distribution of the kinetic energy

405 Estimate the kinetic energy based on the covariance between the kinetic energy and the torques, and the probabilistic posterior distribution of the kinetic energy

400

SYSTEM AND METHOD FOR CONTROLLING A MECHANICAL SYSTEM WITH MULTIPLE DEGREES OF FREEDOM

TECHNICAL FIELD

The present disclosure relates generally to control systems for mechanical manipulators, and more particularly to a system and a method for controlling a robotic manipulator having multiple degrees of freedom and different kind of actuators to track a reference trajectory for performing a task.

BACKGROUND

A mechanical system, e.g., a robotic manipulator, is configured to track a reference trajectory for performing a task. The task, for example, corresponds to moving an object to a target position, or an assembly operation. To control the mechanical system to track the reference trajectory, a model of dynamics of the mechanical system is utilized. The model of dynamics is a mathematical model that includes equations which define dynamics of the mechanical system. Some approaches use a model of inverse dynamics of the mechanical system to control the mechanical system as the model of inverse dynamics enables controlling of the mechanical system. The model of inverse dynamics expresses joint torques as a function of joint positions, velocities and accelerations. It is desired to formulate an accurate model of the inverse dynamics for controlling the mechanical system.

However, formulating the accurate model of inverse dynamics is challenging. For instance, the accuracy of the model of inverse dynamics is often limited by parameter uncertainty. Additionally, it is difficult to model complex dynamics of the mechanical system, such as motor friction or joint elasticity. Therefore, there is a need for a method for formulating an accurate model of inverse dynamics for accurate controlling of the mechanical system.

SUMMARY

It is an object of some embodiments to control a mechanical system using a model of inverse dynamics trained via machine learning. As used herein, a model of forward dynamics connects control commands and current states of the different actuators to transitioned states of the different actuators achieved by executing the control commands. As used herein, the model of inverse dynamics maps the current states and the transitioned states of the different actuators to corresponding torques for the different actuators. The mechanical system is a robotic manipulator having different actuators and multiple degrees of freedom to track a reference trajectory for performing a task. For example, the robotic manipulator is configured to track the reference trajectory for performing a task of moving an object to a target location. The robotic manipulator includes joints and links. Each joint is actuated by an actuator such as an electric motor. An action given by the actuator makes the link attached to the joint move.

Generally, an accurate physical model of the inverse dynamics is difficult and time-consuming to generate. Accuracy of such models is often limited by presence of parameter uncertainty and inability to describe certain complex dynamics typical of real systems, such as motor friction or joint elasticity. To that end, in some embodiments, the model of inverse dynamics is trained using a machine learning algorithm. The model of inverse dynamics trained using the machine learning algorithm is referred to as a data driven model. In contrast to the physical models, the data driven model is trained directly on the basis of experimental data, without requiring knowledge of the mechanical system. Despite ability of the data driven model to approximate complex non-linear dynamics, the data driven model suffers from low data efficiency and poor generalization properties, i.e., trained models require a large amount of samples to be trained and extrapolate only within a neighborhood of training trajectories.

Some embodiments are based on the realization that training the model of inverse dynamics is difficult because of lack of structure of the model of inverse dynamics, that fail to describe physical principles that govern dynamics of the multiple degrees of freedom of the mechanical system. For example, the robotic manipulator may have joints that define the multiple degrees of freedom, and dynamics of the joints are correlated to each other. Therefore, there exists a complex and potentially non-linear correlation between torques for the joints needed to track the reference trajectory. Such a correlation is challenging to learn through training.

Some embodiments are based on the recognition that Gaussian Processes Regression (GPR) can be used to learn the correlation. For example, several Gaussian processes based solutions use GPR to model n torque components one for each degree of freedom with n independent Gaussian Process (GP) and include a model-based component on a mean function or a covariance. As a result, a covariance matrix for such a GPR model is either diagonal or block diagonal to represent that the correlation between torques of the different actuators is not captured.

Some embodiments are based on the realization that such a deficiency is caused, at least in part, by an attempt to model the torque itself as a Gaussian process. However, some embodiments are based on the realization that the Gaussian process can be designed to model energy of the mechanical system. In contrast with modeling individual torques, modeling the energy captures mutual effects of the torques of the different actuators on each other, which in turn allows to learn the correlation among the torques of the different actuators. As a result, the covariance matrix capturing correlations between the torques of the different actuators is a full matrix with non-zero elements inside and outside of the diagonal.

To this end, some embodiments of the present disclosure provide an inverse dynamics model that models energy of the mechanical system with a GPR having a full prior and posterior covariance matrix that captures the correlations between the torques of the different actuators. The inverse dynamics model is trained with the machine learning to map the states of the different actuators to corresponding torques for the different actuators. According to an embodiment, states of the different actuators are processed with the inverse dynamics model to produce values of the torques for the different actuators of the mechanical system. Further, the mechanical system is controlled based on the values of the torques. For instance, control commands are determined based on the values of the torques for the different actuators. Further, the determined control commands are applied to the different actuators to control the mechanical system.

Accordingly, one embodiment discloses a controller for controlling a mechanical system having different actuators and multiple degrees of freedom to track a reference trajectory for performing a task. The controller comprises a memory configured to store an energy based inverse dynamics model trained with machine learning to map states of the different actuators to corresponding torques for the different actuators, wherein the energy based inverse dynamics model is configured to model energy of the mechanical system with a GPR process a covariance matrix capturing correlations between the torques of the different actuators, and wherein the covariance matrix is a full matrix including non-zero elements. The controller further comprises a processor configured to process the states of the different actuators with the energy based inverse dynamics model to produce values of the torques for the different actuators of the mechanical system, and control the mechanical system based on the produced values of the torques for the different actuators of the mechanical system.

Accordingly, another embodiment discloses a method for controlling a mechanical system having different actuators and multiple degrees of freedom to track a reference trajectory for performing a task, wherein the method uses a processor coupled to a memory storing an energy based inverse dynamics model trained with machine learning to map states of the different actuators to corresponding torques for the different actuators, wherein the energy based inverse dynamics model is configured to model energy of the mechanical system with a GPR process a covariance matrix capturing correlations between the torques of the different actuators, and wherein the covariance matrix is a full matrix including non-zero elements, the processor is coupled with stored instructions when executed by the processor carry out steps of the method. The steps of the method comprises processing the states of the different actuators with the energy based inverse dynamics model to produce values of the torques for the different actuators of the mechanical system, and controlling the mechanical system based on the produced values of the torques for the different actuators of the mechanical system.

Accordingly, yet another embodiment discloses a non-transitory computer readable storage medium embodied thereon a program executable by a processor for performing a method for controlling a mechanical system having different actuators and multiple degrees of freedom to track a reference trajectory for performing a task, the storage medium stores an energy based inverse dynamics model trained with machine learning to map states of the different actuators to corresponding torques for the different actuators, wherein the energy based inverse dynamics model is configured to model energy of the mechanical system with a GPR process a covariance matrix capturing correlations between the torques of the different actuators, and wherein the covariance matrix is a full matrix including non-zero elements. The program when executed by the processor carry out steps of the method comprising processing the states of the different actuators with the energy based inverse dynamics model to produce values of the torques for the different actuators of the mechanical system, and controlling the mechanical system based on the produced values of the torques for the different actuators of the mechanical system.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
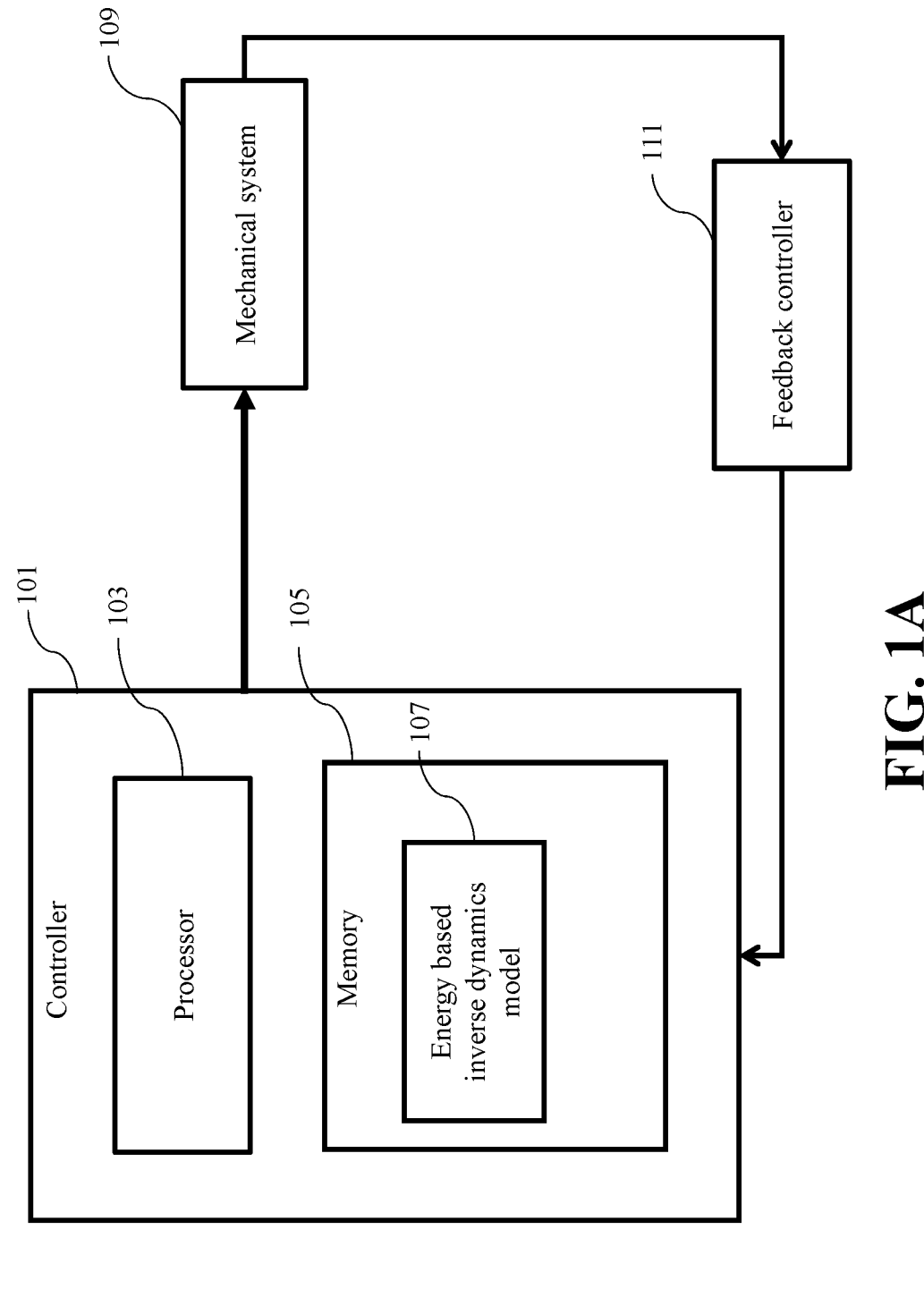
FIG. 1A illustrates a block diagram for controlling a mechanical system, according to some embodiments of the present disclosure.

FIG. 1A illustrates a block diagram 100 of a controller 101 for controlling a mechanical system 109, according to some embodiments of the present disclosure. The controller 101 is communicatively coupled to the mechanical system 109. The controller 101 includes a processor 103 and a memory 105. The processor 103 may be a single core processor, a multi-core processor, a computing cluster, or any number of other configurations. The memory 105 may include random access memory (RAM), read only memory (ROM), flash memory, or any other suitable memory systems. Additionally, in some embodiments, the memory 105 may be implemented using a hard drive, an optical drive, a thumb drive, an array of drives, or any combinations thereof.

In an embodiment, the mechanical system 109 corresponds to a robotic manipulator having different actuators and multiple degrees of freedom to track a reference trajectory for performing a task. An example robotic manipulator is described below FIG. 1B.

Figure 1B:
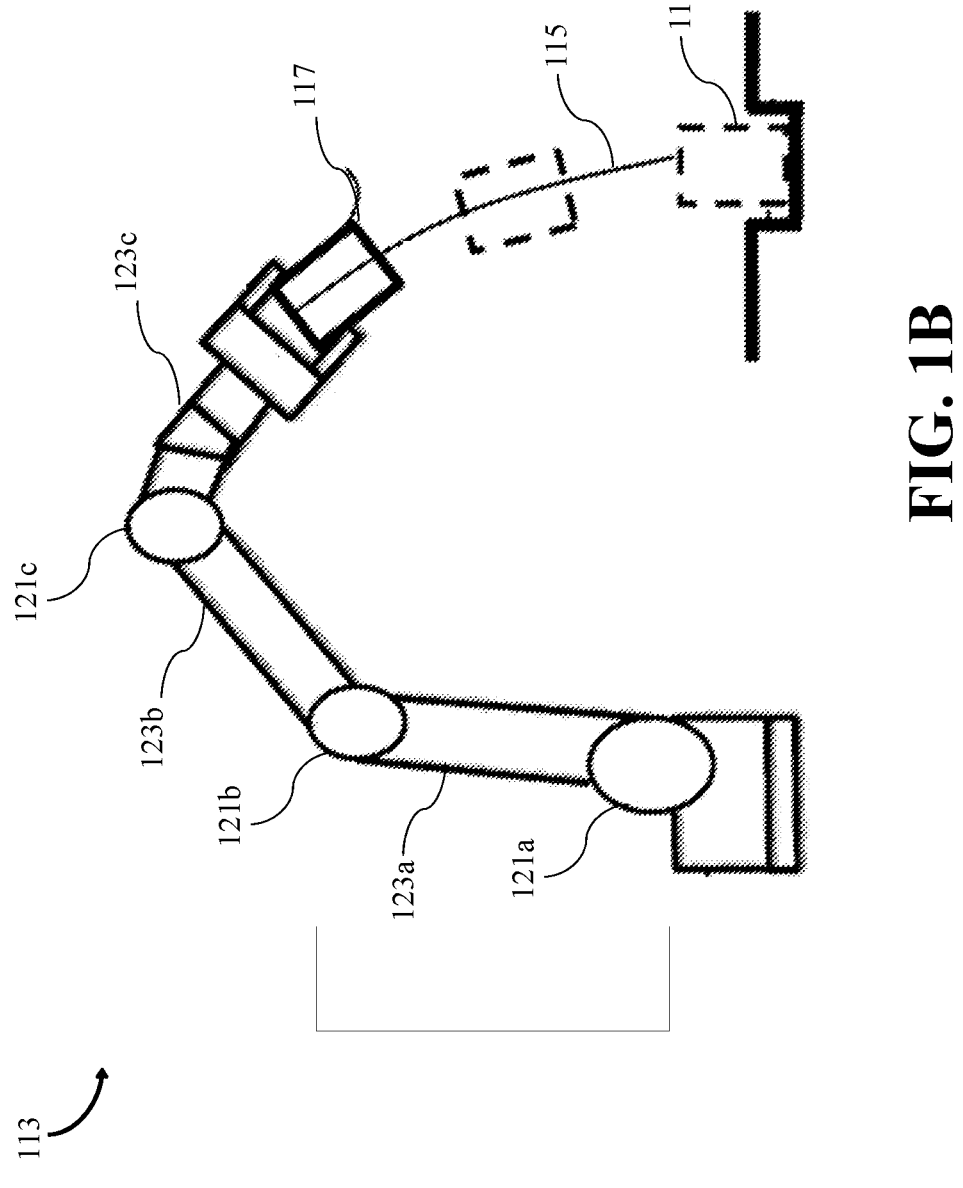
FIG. 1B illustrates a robotic manipulator, according to some embodiments of the present disclosure.

FIG. 1B illustrates a robotic manipulator 113, according to some embodiments of the present disclosure. For example, the robotic manipulator 113 is configured to track a reference trajectory 115 for performing a task of moving an object 117 to a target location 119. In another example, the robotic manipulator 113 is configured to track a reference trajectory for performing an assembly operation. The robotic manipulator 113 includes joints, such as a joint 121*a*, a joint 121*b*, and a joint 121*c*. The robotic manipulator 113 further includes links, such as a link 123*a*, a link 123*b*, and a link 123*c*. Each joint is actuated by an actuator such as an electric motor. An action given by the actuator makes the link attached to the joint move. The movement can be rotational or translational according to a type of the joint. The type of the joint may be a revolute joint or a prismatic joint. The actuator takes as input a desired position of the joint and outputs an action that can be current, torque or a quantity that can be transformed to torque which causes the joint to move to the desired position.

Further, the different actuators are equipped with position sensors (such as encoders) that can measure current positions of the joints. In some embodiments, states of the different actuators are defined as positions of the joints. In some other embodiments, the states of the different actuators are defined as a combination of the positions of the joints and velocities of the joints.

It is an object of some embodiments to control the mechanical system 109 using a model of inverse dynamics trained via machine learning. As used herein, a model of forward dynamics connects control commands and current states of the different actuators to transitioned states of the different actuators achieved by executing the control commands. As used herein, the model of inverse dynamics maps the current states and the transitioned states of the different actuators to corresponding torques for the different actuators.

Generally, deriving an accurate physical model of the inverse dynamics is difficult and time-consuming. Accuracy of such models is often limited by presence of parameter uncertainty and inability to describe certain complex dynamics typical of real systems, such as motor friction or joint elasticity. To that end, in some embodiments, the model of inverse dynamics is trained using the machine learning. The model of inverse dynamics trained using the machine learning is referred to as a data driven model. In contrast to the physical models, the data driven model is learnt directly from experimental data, without requiring knowledge of the mechanical system 109. Despite ability of the data driven model to approximate complex non-linear dynamics, the data driven model suffers from low data efficiency and poor generalization properties, i.e., trained models require a large amount of samples to be trained and extrapolate only within a neighborhood of training trajectories.

Some embodiments are based on the realization that learning the model of inverse dynamics is difficult because of lack of structure of the model of inverse dynamics, that fail to describe physical principles that govern dynamics of the multiple degrees of freedom of the mechanical system 109. For example, the robotic manipulator 113 may have joints that define the multiple degrees of freedom, and dynamics of the joints are correlated to each other. Therefore, there exists a complex and potentially non-linear correlation between torques for the joints needed to track the reference trajectory. Such a correlation is challenging to learn.

Some embodiments are based on the recognition that Gaussian Processes Regression (GPR) can be used to learn the correlation. For example, several Gaussian processes based solutions use GPR to model n torque components one for each degree of freedom with n independent GP and include a model-based component on a mean function or a covariance. As a result, a covariance matrix for such a GPR model is either diagonal or block diagonally to represent that the correlation between torques of the different actuators is not captured. An example of such a covariance matrix is shown below in FIG. 1C.

Figure 1C:
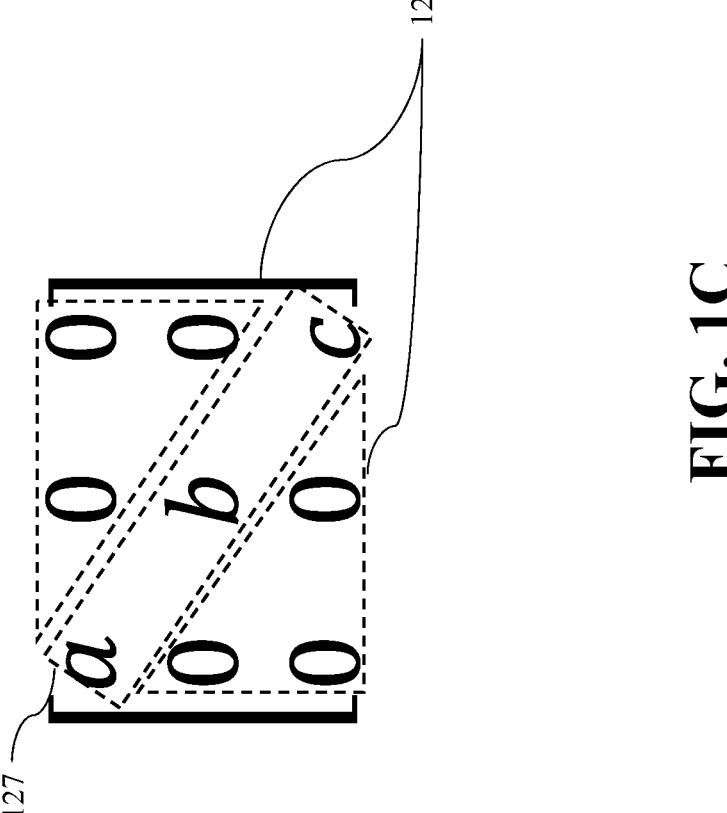
FIG. 1C illustrates a diagonal covariance matrix, according to some embodiments of the present disclosure.

FIG. 1C illustrates an example schematic of a diagonal covariance matrix 125, according to some embodiments of the present disclosure. Diagonal elements 127, i.e., a, b, and c, of the diagonal covariance matrix 125 are non-zero elements, whereas non-diagonal elements 129 are zero. Since the non-diagonal elements 129 of the diagonal covariance matrix 125 are zero, the diagonal covariance matrix 125 indicates that the correlation between torques of the different actuators is not captured.

Some embodiments are based on the realization that such a deficiency is caused, at least in part, by an attempt to model the torque itself as a Gaussian process. However, some embodiments are based on the realization that the Gaussian process can be designed to model energy of the mechanical system 109. In contrast with modeling individual torques, modeling the energy captures mutual effects of the torques of the different actuators on each other, which in turn allows to learn the correlation among the torques of the different actuators. As a result, the covariance matrix capturing correlations between the torques of the different actuators is a full matrix with non-zero elements inside and outside of the diagonal.

To this end, some embodiments of the present disclosure provide an energy based inverse dynamics model 107 that models energy of the mechanical system 109 with a GPR having a covariance matrix that captures the correlations between the torques of the different actuators. The covariance matrix is a full matrix including non-zero elements.

Figure 1D:
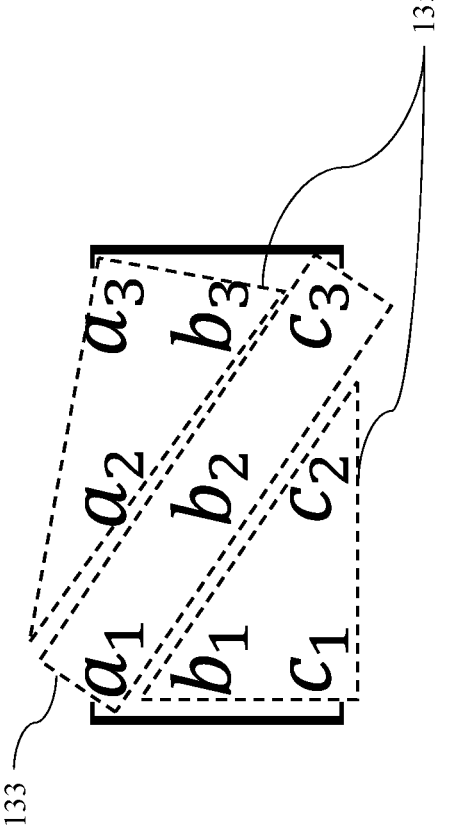
FIG. 1D illustrates a full covariance matrix, according to some embodiments of the present disclosure.
Figure 1D:

FIG. 1D illustrates a full covariance matrix 131, according to some embodiments of the present disclosure. Diagonal elements 133, i.e., $a_1$, $b_2$, and $c_3$, and non-diagonal elements 135, i.e., $a_2$, $a_3$, $b_1$, $b_3$, $c_1$, and $c_2$, of the full covariance matrix 131 are non-zero elements. Since the elements of the full covariance matrix 131 are non-zero elements, the full covariance matrix 131 captures the correlations between the torques of the different actuators.

In an embodiment, the energy based inverse dynamics model 107 is stored in the memory 105. The energy based inverse dynamics model 107 is trained with the machine learning to map the states of the different actuators to corresponding torques for the different actuators. Hereinafter, the energy based inverse dynamics model 107 is referred to as an inverse dynamics model 107.

The processor 103 is configured to process the states of the different actuators with the inverse dynamics model 107 to produce values of the torques for the different actuators of the mechanical system 109. For instance, the states of the different actuators are applied as input to the inverse dynamics model 107. Based on the states of the different actuators, the inverse dynamics model 107 produces the values of the torques for the different actuators of the mechanical system 109. The processor 103 is further configured to control the mechanical system 109 based on the values of the torques. For instance, in an embodiment, the processor 109 determines control commands based on the values of the torques for the different actuators. Further, the determined control commands are applied to the different actuators. The control commands cause the different actuators to change their states to track the reference trajectory. The changed states of the different actuators are input to a feedback controller 111. Based on the changed states of the different actuators, the feedback controller 111 is configured to provide a correction to the values of the torques to compensate for errors in the positions and the velocities of the joints to accurately track the reference trajectory.

The formulation of the inverse dynamics model 107 used to produce the values of the torques is explained below with reference to FIG. 2.

Figure 2:
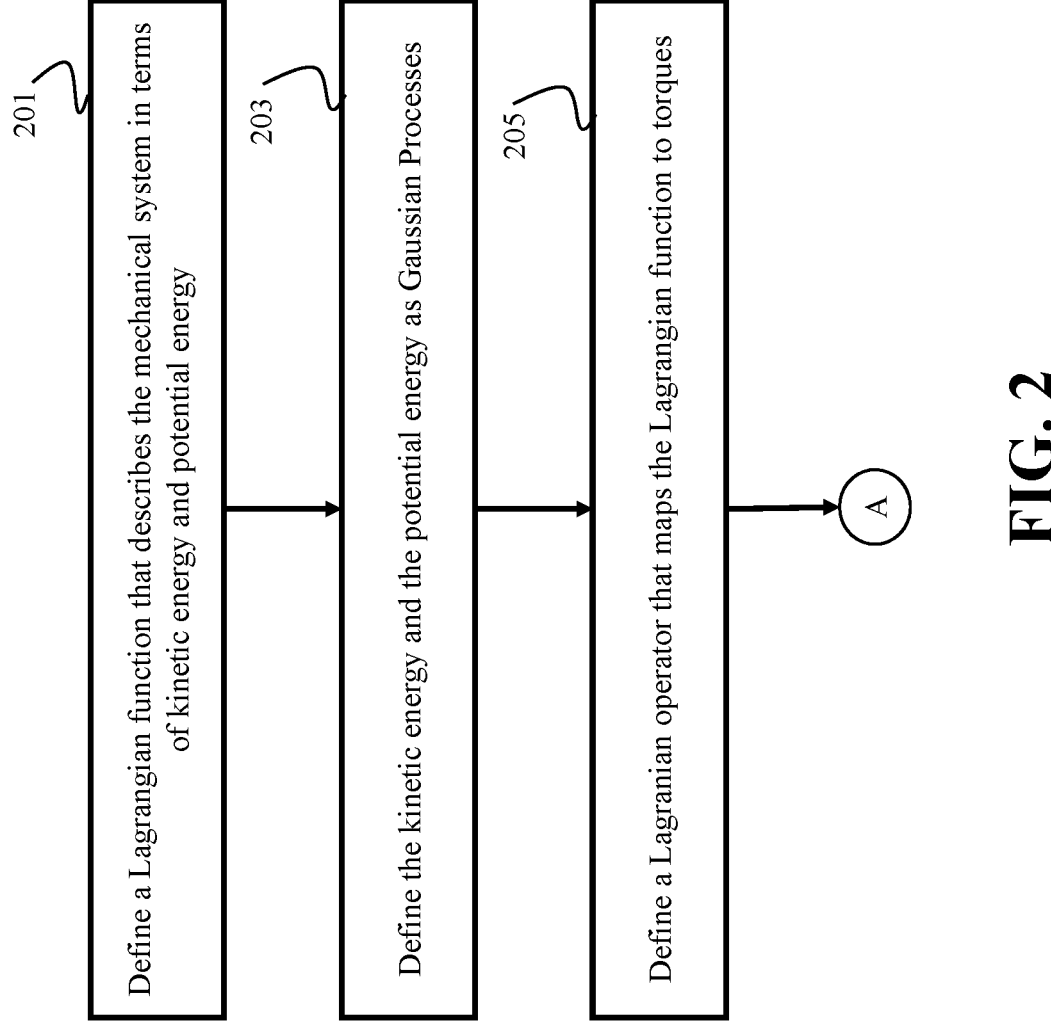
FIG. 2 illustrates a block diagram of a method for formulating an inverse dynamics model, according to some embodiments of the present disclosure.
Figure 2:
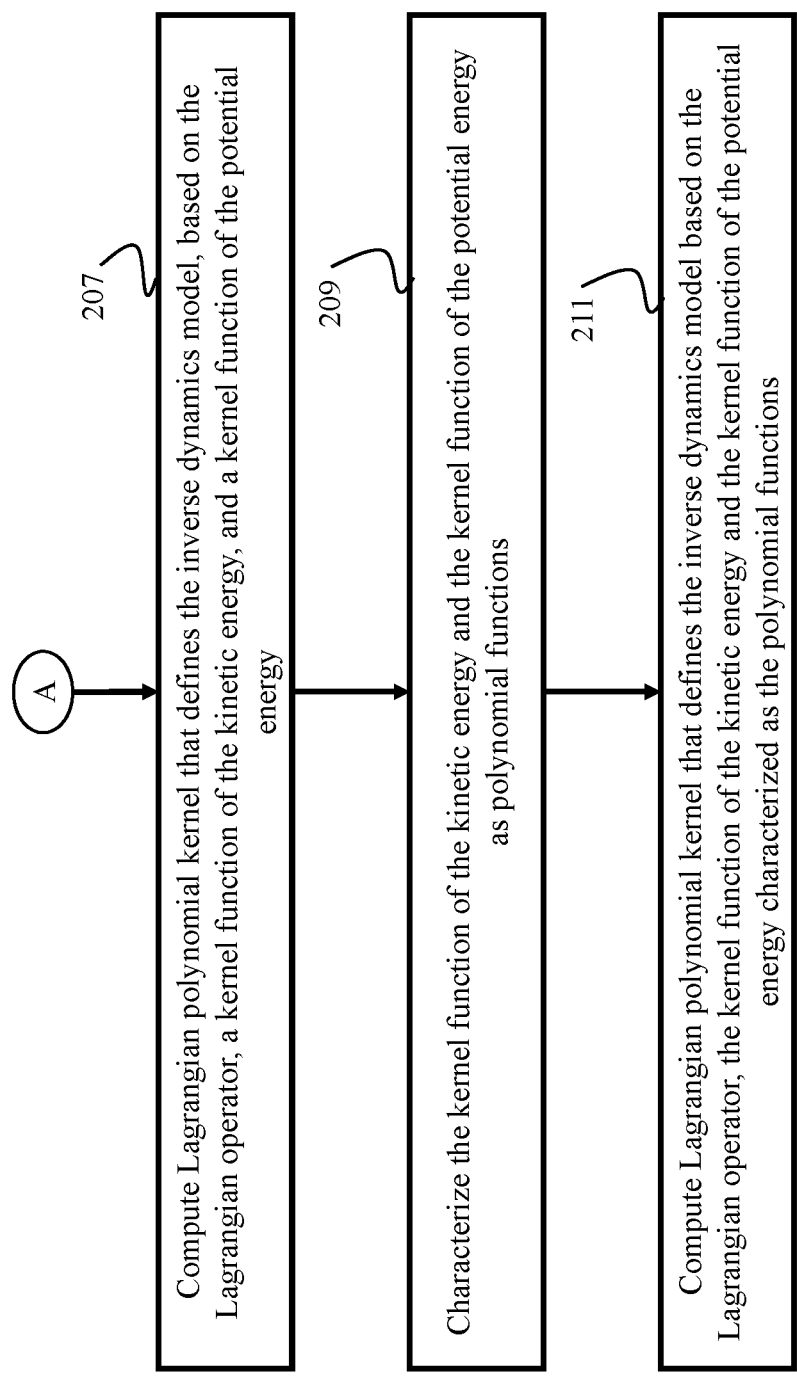

FIG. 2 illustrates a flow diagram of a method 200 for formulating the inverse dynamics model 107, according to some embodiments of the present disclosure. In general, GPR can use different types of kernels to learn the inverse dynamics of the mechanical system 109 by modeling its energy. Some embodiments use physics informed energy kernels that define the energy of the mechanical system 109. The energy kernels increase an accuracy of the inverse dynamics model 107. For example, the energy kernels define the energy using a function of kinetic energy and a function of potential energy. Such kernels advantageously consider laws of preservation of energy of the mechanical system 109.

To that end, at block 201 of the method 200, a Lagrangian function that describes the mechanical system 109 in terms of energies of the mechanical system 109, i.e., kinetic energy and potential energy, is defined. For instance, the Lagrangian function, such as $\mathcal{L}(q, \dot{q})$, is defined as a difference between the kinetic energy and the potential energy of the mechanical system 109

$$\mathcal{L}(q, \dot{q}) = \mathcal{T}(q, \dot{q}) - V(q)$$

Let $\mathcal{T}(q, \dot{q})$ and $\mathcal{V}(q)$ be, respectively, the kinetic energy and the potential energy of the mechanical system 109 with n degrees of freedom.

At block 203 of the method 200, the kinetic energy $\mathcal{T}(q, \dot{q})$ and the potential energy $\mathcal{V}(q)$ are defined as two independent zero-mean Gaussian Processes (GPs) with covariance determined by kernel functions $k^{\mathcal{T}}(x, x')$ and $k^{\mathcal{V}}(x, x')$ $$\mathcal{T} \sim GP(0, k^{\mathcal{T}}(x, x')),$$

$$\mathcal{V} \sim GP(0, k^{\mathcal{V}}(x, x')).$$

where $x = [q, \dot{q}, \ddot{q}]$ and $\dot{q}$ are the joint positions, $\dot{q}$ are the joint velocities and $\ddot{q}$ are the joint accelerations. A GP prior on $\mathcal{T}(q, \dot{q})$ and $\mathcal{V}(q)$ cannot be used directly in GPR to compute posterior distributions since the kinetic energy and the potential energy are not measured. However, starting from the GP prior on the kinetic energy and the potential energy, some embodiments derive a GP prior for the torques of the inverse dynamics by relying on Lagrangian mechanics. Lagrangian mechanics states that inverse dynamics equations $$B(q)\ddot{q} + c(q, \dot{q}) + g(q) + \tilde{\tau} = \tau,$$

also named Lagrange's equations, where B(q) is an inertia matrix, c(q, $\dot{q}$) and g(q) account, respectively, for contributions of fictitious forces and gravity, and $\tilde{\tau}$ are torques due to friction and unknown dynamical effects, are solutions of a set of differential equations of the Lagrangian function $\mathcal{L}$ (q, $\dot{q}$). The differential equation of the i-th row is $$\frac{d\mathcal{L}}{dt}\left(\frac{\partial \mathcal{L}}{\partial \dot{q}^i}\right) - \frac{\partial \mathcal{L}}{\partial q^i} = \tau^i,$$

where $q^i$, $\dot{q}^i$ and $\tau^i$ are, respectively, i-th component of q, $\dot{q}$ and $\tau$. The Lagrangian equations can be rewritten avoiding explicit differentiation with respect to time using a chain rule, which leads to following linear partial differential equation of $\mathcal{L}$.

$$\sum_{i=1}^{n}\left(\frac{\partial^2 \mathcal{L}}{\partial \dot{q}^i \partial \dot{q}^j}\ddot{q}^j + \frac{\partial^2 \mathcal{L}}{\partial \dot{q}^i \partial q^j}\dot{q}^j\right) - \frac{\partial \mathcal{L}}{\partial q^i} = \tau^i.$$

At block 205 of the method 200, a Lagranian operator $G_i$ that maps the Lagrangian function $\mathcal{L}$ of the mechanical system 109 to the torques $\tau^i$ of the different actuators, is defined by a set of partial differential equations as $$G_i\mathcal{L} = \sum_{j=1}^{n}\left(\frac{\partial^2 \mathcal{L}}{\partial \dot{q}^i \partial \dot{q}^j}\ddot{q}^j + \frac{\partial^2 \mathcal{L}}{\partial \dot{q}^i \partial q^j}\dot{q}^j\right) - \frac{\partial \mathcal{L}}{\partial q^i} = \tau^i,$$

and $$\tau = G\mathcal{L} = [G_1\mathcal{L} \dots G_n\mathcal{L}]^T.$$

Some embodiments define the model of $\mathcal{L}$ as a GP since $\mathcal{T}$ and $\mathcal{V}$ are two independent GPs. This is because sum of two independent GPs is a GP, and its kernel is a sum of kernels, namely, $$\mathcal{L} \sim GP(0, k^{\mathcal{L}}(x, x')),$$

$$k^{\mathcal{L}}(x, x') = k^{\mathcal{T}}(x, x') + k^{\mathcal{V}}(x, x').$$

Further, applying property of GPs and linear operators to $G\mathcal{L}$ (x), the inverse dynamics is modeled as $\tau \sim GP$ (0, k$^{\tau}$(x, x')) a zero mean GP, with covariance function k$^{\tau}$(x, x')) named Lagrangian polynomial kernel.

To this end, at block 207 of the method 200, the Lagrangian polynomial kernel that defines the inverse dynamics model 107 is computed based on the Lagrangian operator, the kernel function $k^{\mathcal{T}}$ of the kinetic energy and the kernel function $k^{\mathcal{V}}$ of the potential energy as $$k^{\tau}(x, x') = \begin{bmatrix} G_1 G_1' k^{\mathcal{L}}(x, x') & \dots & G_1 G_n' k^{\mathcal{L}}(x, x') \\ \vdots & \ddots & \vdots \\ G_n G_1' k^{\mathcal{L}}(x, x') & \dots & G_n G_n' k^{\mathcal{L}}(x, x') \end{bmatrix}$$

Therefore, some embodiments of the present disclosure model the inverse dynamics function as an unknown multi-input multi-output function f(x):$R^{3n} \rightarrow R^n$ while classic approaches model the inverse dynamics as n single-output functions $f^i$(x):$R^{3n} \rightarrow R$, i=1, . . . , n.

Some embodiments are based on the realization that the kernel functions $k^{\mathcal{V}}$ and $k^{\mathcal{T}}$ used to define the prior on the potential energy and on the kinetic energy can be formulated as polynomial functions in a space defined by a trigonometric transformation of the state of the mechanical system 109. Such a formulation gives a physics informed structure to the kernel functions with a compact number of parameters to be learned. Therefore, at block 209, $k^{\mathcal{T}}$ of the kinetic energy and the kernel function $k^{\mathcal{V}}$ of the potential energy are characterized as polynomial functions. The kernel functions $k^{\mathcal{V}}$ and $k^{\mathcal{T}}$ are defined based on two propositions that characterize $\mathcal{V}$ and $\mathcal{T}$ as polynomial functions in a space defined by a trigonometric transformation of the state of the mechanical system 109. The state of the mechanical system 109 may include the positions and velocities of the joints of the mechanical system 109. The trigonometric transformation is defined as follows.

Let $q^i$, $\dot{q}^i$ be vectors including the positions and the velocities of the joints up to index i, respectively:

$$q^i = \left[q^1, \ldots, q^i\right]^T \in \mathbb{R}^i,$$

$$\dot{q}^i = \left[\dot{q}^1, \ldots, \dot{q}^i\right]^T \in \mathbb{R}^i.$$

$N_r$ and $N_p$ are, respectively, a number of revolute and prismatic joints, with $N_r + N_p = n$. Sets $I_r = \{r_1, \ldots, r_{N_r}\}$ and $I_p = \{p_1, \ldots, p_{N_p}\}$ include the revolute and prismatic joints indexes, respectively. Further, following vectors are defined:

$$q_c = [\cos(q'^1), \ldots, \cos(q'^{N_r})]^T \in \mathbb{R}^{N_r},$$

$$q_s = [\sin(q'^1), \ldots, \sin(q'^{N_r})]^T \in \mathbb{R}^{N_r},$$

$$q_p = \left[q^{p_1}, \ldots, q^{p_{N_p}}\right]^T \in \mathbb{R}^{N_p}.$$

$$q_c^b, q_s^b$$

and $$q_p^b$$

denote b-th element of $q_c$, $q_s$ and $q_p$, respectively.

Next, let $$I_r^i \ (resp.\ I_p^i)$$

be a subset of $I_r$ (resp. $I_p$) composed by indexes lower or equal to i and the vectors $$q_c^i, q_s^i, \left(resp.\ q_p^i\right)$$

are defined as restriction of $q_c$, $q_s$ (resp. $q_p$) to $$I_r^i \ (resp.\ I_p^i).$$

For the sake of clarity, consider the following example. Let index i be such that $r_j \leq i < r_{j+1}$ for some $1 \leq j < r_{N_r}$. Then $I_r^i = \{r_1, \ldots r_j\} \in \mathbb{R}^i$, $q_c^i =$ $[\cos(q'^1), \ldots, \cos(q'^j)]^T \in \mathbb{R}^i$ and $q_s^i = [\sin(q'^1), \ldots, \sin(q'^j)]^T \in \mathbb{R}^j$.

To conclude let $q_{cs_b}$ be the vector concatenating the b-th elements of $q_c$ and $q_s$, that is, $$q_{cs_b} = \left[q_c^b, q_s^b\right]^T.$$

According to an embodiment, the kernel function of the potential energy $k^v$ is a polynomial function in a space defined by a trigonometric transformation $m_v$ of the state of the mechanical system 109. The following proposition establishes that the potential energy is polynomial with respect to a set of variables $m_v = (q_c, q_s, q_p)$ that are functions of the joint positions vector q. $m_v$ is the trigonometric transformation of the state of the mechanical system 109 that is the space over which the potential energy is a polynomial function.

Proposition-1 Consider a manipulator with n+1 links and n joints. Total potential energy $\mathcal{V}(q)$ belongs to space $\mathbb{P}(n)(q_{c_{(1)}}, q_{s_{(1)}}, q_{p_{(1)}})$, namely it is a polynomial function in $(q_c, q_s, q_p)$ of degree not greater than n, such that each element of $q_c$, $q_s$ and $q_p$ appears with degree not greater than 1. Moreover, for any monomial of the aforementioned polynomial, a sum of degrees of $$q_c^b \text{ and } q_s^b$$

is equal or lower than 1, namely, it holds $$deg\!\left(q_c^b\right) + deg\!\left(q_s^b\right) \leq 1.$$

To comply with constraints on the maximum degree of each term, the kernel function $k^v(x, x')$ is defined as a product of $N_r + N_p$ inhomogeneous polynomial kernels where $N_r$ kernels have p=1 and each of them is defined on the 2-dimensional input space given by $q_{cs_b}$, $b \in I_r$, and $N_p$ kernels have p=1 and each of them is defined on the 1-dimensional input $$q_p^b,$$

$b \in I_p$. Resulting kernel function for the potential energy is then given by $$k^V(x, x') = \prod_{b \in I_r} k_{pk}^{(1)}\!\left(q_{cs_b}, q'_{cs_b}\right) \prod_{b \in I_p} k_{pk}^{(1)}\!\left(q_p^b, q'^b_p\right). \tag{1}$$

Each of n kernels accounts for contribution of a distinct joint, and the potential energy kernel $k^v(x, x')$ spans $\mathbb{P}(n)$ $(q_{c_{(1)}}, q_{s_{(1)}}, q_{p_{(1)}})$. Further, since all the $N_r$ kernels defined on $q_{cs_b}$, $b \in I_r$, have p=1, constraint $$deg\!\left(q_c^b\right) + deg\!\left(q_s^b\right) \leq 1$$

is satisfied.

Further, some embodiments are based on the observation that total kinetic energy is a sum of the kinetic energies relative to each link, that is, $$\mathcal{T}(q, \dot{q}) = \sum_{i=1}^{n} \mathcal{T}_i(q, \dot{q}),$$

where $\mathcal{T}_i(q, \dot{q})$ is the kinetic energy of link i. The kinetic energy $\mathcal{T}_i$ is a polynomial function with respect to a set of variables $m_{\mathcal{T}} =$ $$\left(q_c^i, q_s^i, q_p^i, \dot{q}^i\right),$$

which are functions of the joints positions and velocities vectors $q^i$ and $\dot{q}^i$. Therefore, the following proposition is established for the kinetic energy.

Proposition-2 Consider a manipulator with n+1 links and n joints. The kinetic energy $\mathcal{T}_i(q, \dot{q})$ of link i belongs to $\mathbb{P}_{(2i+2)}$ $$\left(q_{c_{(2)}}^i, q_{s_{(2)}}^i, q_{P_{(2)}}^i, \dot{q}_{(2)}^i\right),$$

namely it is a polynomial function in $$\left(q_c^i, q_s^i, q_p^i, \dot{q}^i\right)$$

of degree not greater than 2i+2, such that:
  (i) each element of $$q_c^i, q_s^i, q_p^i \text{ and } \dot{q}^i$$

appears with degree not greater than 2;
  (ii) each monomial has inside a term of the type $\dot{q}^i \dot{q}^j$ for $1 \le i \le n$ and $i \le j \le n$; and
  (iii) in any monomial a sum of degrees of $$q_c^b \text{ and } q_s^b$$

is equal or lower than 2, namely $$deg\left(q_c^b\right) + deg\left(q_s^b\right) \le 2.$$

To comply with constraints and properties stated in the above proposition, a kernel function given by a product of i inhomogeneous polynomial kernels and 1 homogeneous kernel is adopted, where $$\left| I_r^i \right|$$

inhomogeneous kernels have p=2 and each of them is defined on the 2-dimensional input space given by $q_{cs_b}$, $b \in I_r$;

$$\left| I_p^i \right|$$

inhomogeneous kernels have p=2 and each of them is defined on the 1-dimensional input $$q_p^b,$$

$b \in I_p$;
  1 homogeneous kernel have p=2 and is defined on the i-dimensional input $\dot{q}^i$.
  Resulting kernel function for the kinetic energy is then given by $$k_i^{\mathcal{T}}(x, x') = k_{hpk}^{(2)}(\dot{q}^i, \dot{q}'^i) \prod_{b \in I_r^i} k_{pk}^{(2)}(q_{cs_b}, q_{cs_b}') \cdot \prod_{b \in I_p^i} k_{pk}^{(2)}(q_p^b, q_p'^b) \qquad (2)$$

where $$\left| I_r^i \right| + \left| I_p^i \right| = i.$$

As all the kernels have p=2, properties (i) and (iii) of the proposition-2 are satisfied. Further, using a homogeneous kernel defined on $\dot{q}^i$ with p=2 guarantees validity of property (ii). Finally, the kernel function of the kinetic energy, $k^{\mathcal{T}}$ is defined as $$k^{\mathcal{T}}(x, x') = \sum_{i=1}^{n} k_i^{\mathcal{T}}(x, x').$$

At block 211 of the method 200, the Lagrangian polynomial kernel, $k^{\tau}$, that defines the inverse dynamics model 107 is computed based on the Lagrangian operator $\mathcal{G}$, the kernel function of the potential energy (1) and the kernel function of the kinetic energy (2) characterized as the polynomial functions $$k^{\tau}(x, x') = \begin{bmatrix} \mathcal{G}_1 \mathcal{G}_1' k^{\mathcal{L}}(x, x') & \cdots & \mathcal{G}_1 \mathcal{G}_n' k^{\mathcal{L}}(x, x') \\ \vdots & \ddots & \vdots \\ \mathcal{G}_n \mathcal{G}_1' k^{\mathcal{L}}(x, x') & \cdots & \mathcal{G}_n \mathcal{G}_n' k^{\mathcal{L}}(x, x') \end{bmatrix}.$$

where $$k^{\mathcal{L}}(x, x') =$$

$$k^{\mathcal{T}}(x, x') + k^{\mathcal{V}}(x, x') = k_{hp}^{(2)}(\dot{q}^i, \dot{q}'^i) \prod_{b \in I_r^i} k_p^{(2)}(q_{cs_b}, q_{cs_b}') \prod_{b \in I_p^i} k_p^{(2)}(q_p^b, q_p'^b) +$$

$$\prod_{b \in I_r^i} k_p^{(1)}(q_{cs_b}, q_{cs_b}') \prod_{b \in I_p^i} k_p^{(1)}(q_p^b, q_p'^b)$$

adopting for $k^{\mathcal{V}}$ and $k^{\mathcal{T}}$ the polynomial functions defined above and $\mathcal{G}_i, \mathcal{G}_j'$, are elements of the Lagrangian operator $\mathcal{G}$. Proposition-1 characterizes the potential energy $\mathcal{V}$ of the whole mechanical system 109, while proposition 2 focuses on the kinetic energy of each link. In general, characterizing the energies for each link and designing a tailored kernel to be combined as executed for $k^T$ allows for higher flexibility in terms of regularization and for more accurate predictions.

According to an embodiment, one or more hyperparameters of the Lagrangian polynomial kernel are determined based on a machine learning process as described below in FIG. 3.

Figure 3:
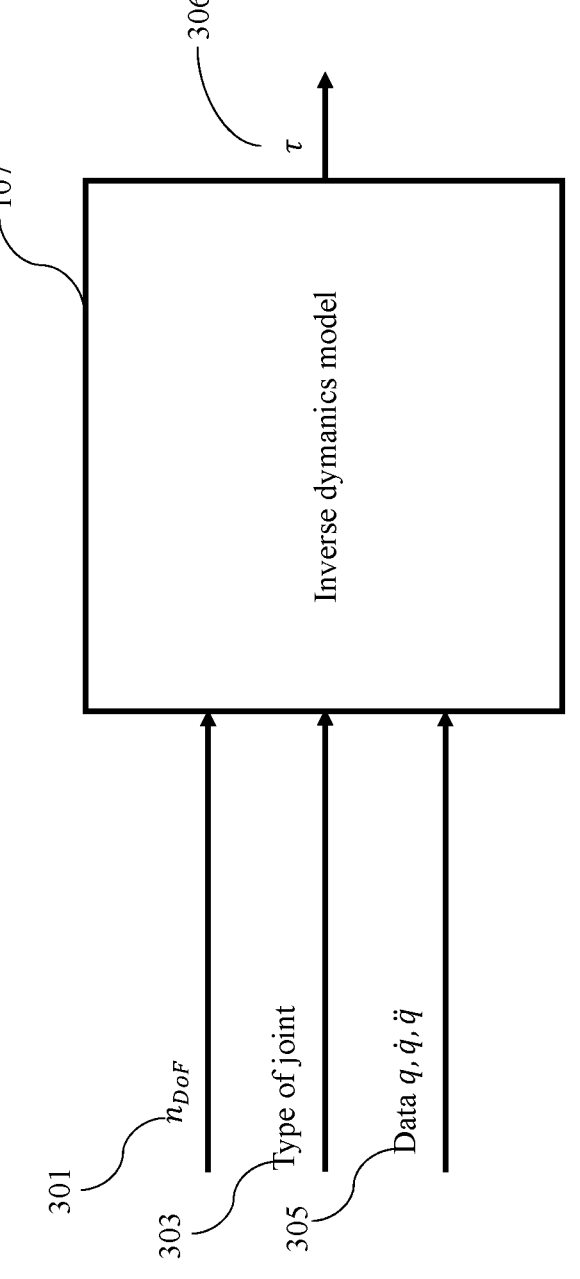
FIG. 3 illustrates a block diagram showing training of hypermeters of a Lagrangian polynomial kernel, according to an embodiment of the present disclosure.

FIG. 3 illustrates training of the one or more hyperparameters of the Lagrangian polynomial kernel, according to an embodiment of the present disclosure. Training data including a number of degrees of freedom $n_{DoF}$ 301, a type of the joint (i.e., revolute joint or prismatic joint) 303, data q, q̇, q̈ 305 that are the joint positions, joint velocities and joint accelerations, respectively, and data τ 306, that are the torques, that is obtained by executing one or more trajectories in the mechanical system 109, is used to train the one or more hyperparameters of the Lagrangian polynomial kernel that defines the inverse dynamics model 107. The number of degrees of freedom $n_{DoF}$ 301, and type of the joint 303 are inputs that a user specifies and are the only knowledge required of the mechanical system 109. The data q, q̇, q̈ 305 and data τ 306 are obtained by executing trajectories on the mechanical system 109, that may be a sequence of positions if the mechanical system 109 is controlled in position, or a sequence of velocities if the mechanical system 109 is controlled in velocity or a sequence of torques if 109 is controlled in torque. In some embodiments for example these trajectories are sum of sinusoids in the joint positions q.

In an embodiment, input of the inverse dynamics model 107 during training is the data q, q̇, q̈ 305 and labels are the torques. The one or more hyperparameters can be trained based on any machine learning algorithm. In some embodiments, the one or more hyperparameters are learned with the machine learning algorithm using maximization of marginal likelihood. The one or more hyperparameters are the parameters that define the kernel function of the Gaussian process. For example, in a standard squared exponential kernel the one or more hyperparameters are scaling factors and length scales of the squared exponential function. In some embodiments, the one or more hyperparameters can be coefficients of the polynomial functions that define the Lagrangian kernel $k^\mathcal{L}$ (x, x').

According to some embodiments, the inverse dynamics model 107 is a multi-input-multi-output (MIMO) torque estimator model that produces the torques for the different actuators based on the positions of the joints of the mechanical system 109, and velocity and acceleration of the multiple degrees of freedom. In other words, the positions of the joints, and velocity and acceleration of the multiple degrees of freedom are applied as input to the MIMO torque estimator, and the MIMO torque estimator outputs the torques for the different actuators.

Additionally, or alternatively, in some embodiments, the inverse dynamics model 107 is used to estimate the kinetic energy and the potential energy from torque measurements. For instance, the processor 103 is configured to process the states of the different actuators with the inverse dynamics model 107 to estimate the potential energy of the mechanical system 109 and the kinetic energy of the mechanical system 109. The estimation of the potential energy is described in detail below in FIG. 4A and the estimation of the potential energy is explained in detail below in FIG. 4B.

Figure 4A:
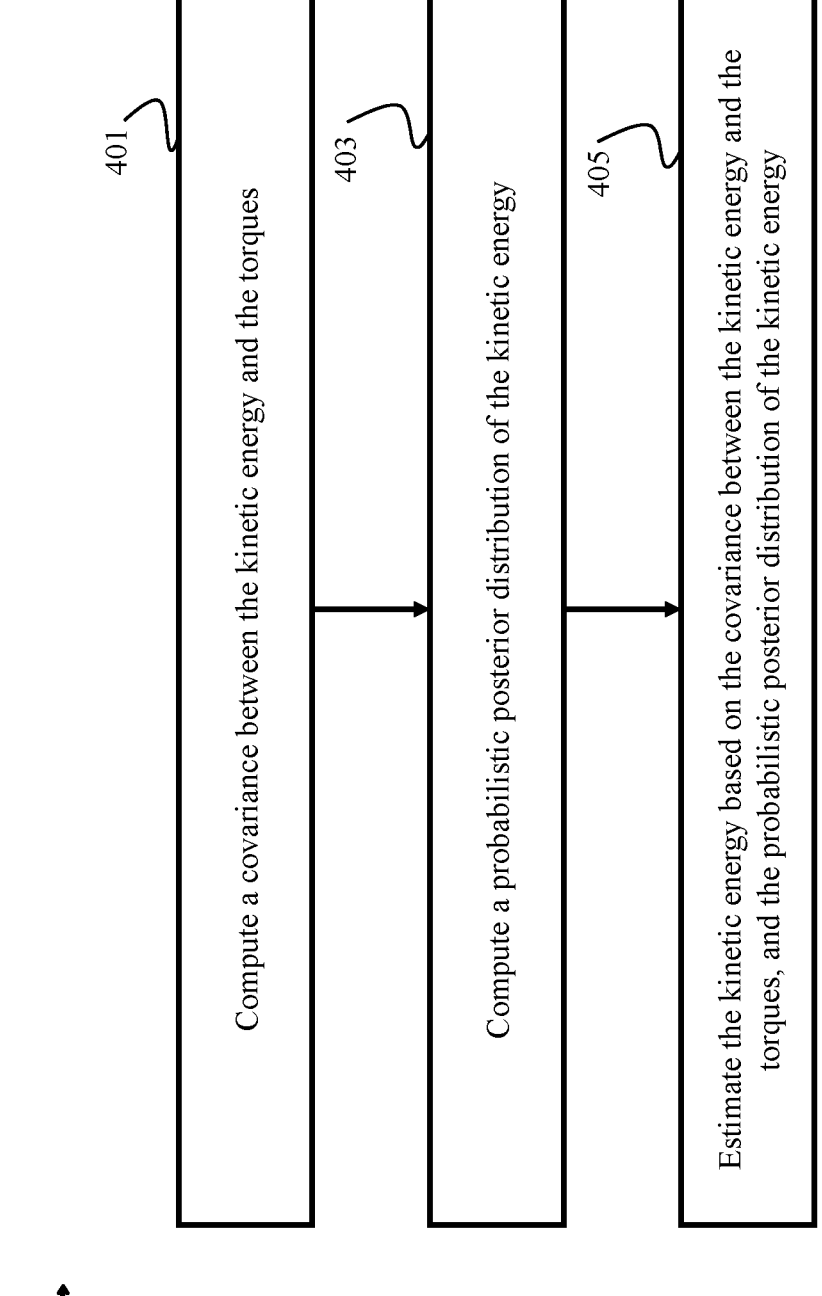
FIG. 4A illustrates a flow diagram of a method for estimation of kinetic energy of the mechanical system, according to some embodiments of the present disclosure.

FIG. 4A illustrates a block diagram of a method 400 for estimation of the kinetic energy, according to some embodiments of the present disclosure. Some embodiments are based on the recognition that, in the inverse dynamics model 107, $\mathcal{T}$, $\mathcal{V}$ and τ are jointly Gaussian distributed, since prior of τ is derived by applying the Lagrangian operator $\mathcal{G}$ to the kinetic and potential GPs $\mathcal{T}$ and $\mathcal{V}$. A covariance between $\mathcal{T}$ and τ and a covariance between $\mathcal{V}$ and τ at general input locations x and x' are $$\mathrm{Cov}\,[\mathcal{T}(x),\,\tau(x')] = \mathrm{Cov}\,[\mathcal{T}(x),\,\mathcal{G}\mathcal{L}(x')] = k^{\mathcal{T}\tau}(x,\,x'),$$
$$\mathrm{Cov}\,[\mathcal{V}(x),\,\tau(x')] = \mathrm{Cov}\,[\mathcal{V}(x),\,\mathcal{G}\mathcal{L}(x')] = k^{\mathcal{V}\tau}(x,\,x').$$

At block 401 of the method 400, the processor 103 is configured to compute the covariance between the kinetic energy $\mathcal{T}$ and the torques τ as $$
\begin{aligned}
k^{\mathcal{T}\tau}(x, x') &= \mathrm{Cov}\,[\mathcal{T}(x),\, \mathcal{G}\mathcal{T}(x') - \mathcal{G}\mathcal{V}(x')] \\
&= \mathrm{Cov}\,[\mathcal{T}(x),\, \mathcal{G}\mathcal{T}(x')] \\
&= \left[\mathcal{G}'k^{\mathcal{T}}(x')\right]^T \\
&= \left[\mathcal{G}'_1 k^{\mathcal{T}}(x, x'),\, \dots,\, \mathcal{G}_n, k^{\mathcal{T}}(x, x')\right]
\end{aligned}
$$

At block 403 of the method 400, the processor 103 is configured to compute a probabilistic posterior distribution of the kinetic energy.

At block 405 of the method 400, the processor 103 is configured to estimate the kinetic energy from the probabilistic posterior distribution of the kinetic energy based on the covariance between the kinetic energy $\mathcal{T}$ and the torques τ, as $$E[\mathcal{T}(x)|\mathcal{D}] = K_{xX}^{\mathcal{T}\tau}(K_{XX} + \Sigma_e)^{-1}y$$

Further, in an embodiment, an uncertainty of the kinetic energy may be given by $$\mathbb{V}[\mathcal{T}(x)] = k^{\mathcal{T}}(x, x) - K_{xX}^{\mathcal{T}\tau}(K_{XX} + \Sigma_e)^{-1}\left(K_{xX}^{\mathcal{T}\tau}\right)^T$$

Figure 4B:
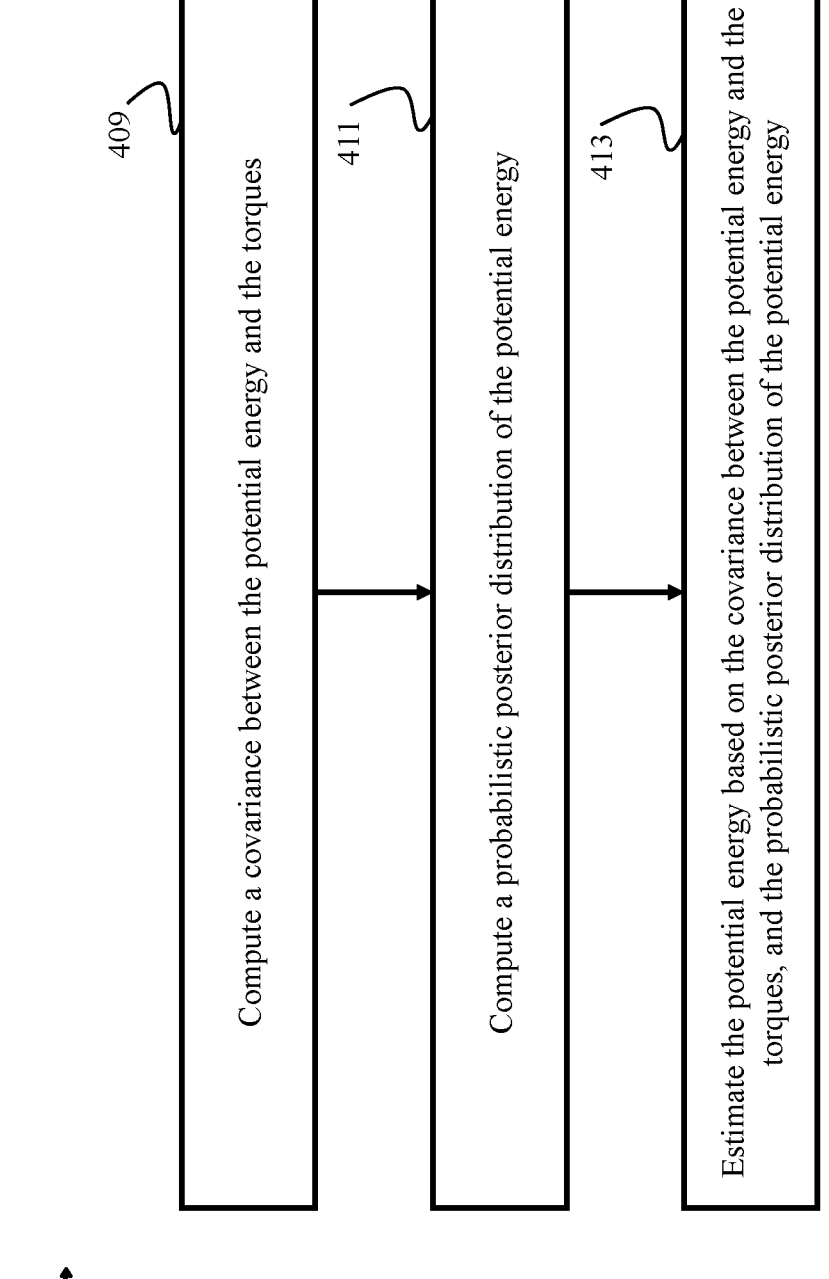
FIG. 4B illustrates a flow diagram of a method for estimation of potential energy of the mechanical system, according to some embodiments of the present disclosure.

FIG. 4B illustrates a block diagram of a method 407 for estimation of the potential energy, according to some embodiments of the present disclosure. At block 409 of the method 407, the processor 103 is configured to compute a covariance between the potential energy $\mathcal{V}$ and the torques τ as $$
\begin{aligned}
k^{\mathcal{V}\tau}(x, x') &= \mathrm{Cov}\,[\mathcal{V}(x),\, \mathcal{G}\mathcal{T}(x') - \mathcal{G}\mathcal{V}(x')] \\
&= \mathrm{Cov}\,[\mathcal{V}(x),\, -\mathcal{G}\mathcal{V}(x')] \\
&= -\left[\mathcal{G}'k^{\mathcal{V}}(x, x')\right]^T \\
&= -\left[\mathcal{G}'_1 k^{\mathcal{V}}(x, x'),\, \dots,\, \mathcal{G}_n, k^{\mathcal{V}}(x, x')\right].
\end{aligned}
$$

At block 411 of the method 407, the processor 103 is configured to compute the probabilistic posterior distribution of the potential energy.

At block 413 of the method 407, the processor 103 is configured to estimate the potential energy from the probabilistic posterior distribution of the potential energy based on the covariance between the potential energy $\mathcal{V}$ and the torques $\tau$, as $$E[\mathcal{V}(x)|\mathcal{D}] = K_{xX}^{V\tau}(K_{XX} + \Sigma_e)^{-1} y$$

Further, an uncertainty of the potential energy may be given by $$\mathbb{V}[\mathcal{V}(x)] = k^V(x, x) - K_{xX}^{V\tau}(K_{XX} + \Sigma_e)^{-1}\left(K_{xX}^{V\tau}\right)^T$$

According to an embodiment, covariance matrices $K_{xX}^{\mathcal{T}\tau} \in \mathbb{R}$ and $K_{xX}^{\mathcal{V}\tau} \in \mathbb{R}$ are obtained as $$K_{xX}^{\mathcal{T}\tau} = \left[k^{\mathcal{T}\tau}(x, x_1), \ldots, k^{\mathcal{T}\tau}(x, x_N)\right]$$
$$K_{xX}^{\mathcal{V}\tau} = \left[k^{V\tau}(x, x_1), \ldots, k^{V\tau}(x, x_N)\right]$$

Some embodiments are based on the realization that the estimated kinetic energy and the potential energy can be used to detect anomaly of the mechanical system 109 during operation of the mechanical system 109 (e.g., while performing the task). The anomaly detection based on the estimated kinetic energy and the potential energy of the mechanical system 109 is explained below in FIG. 5.

Figure 5:
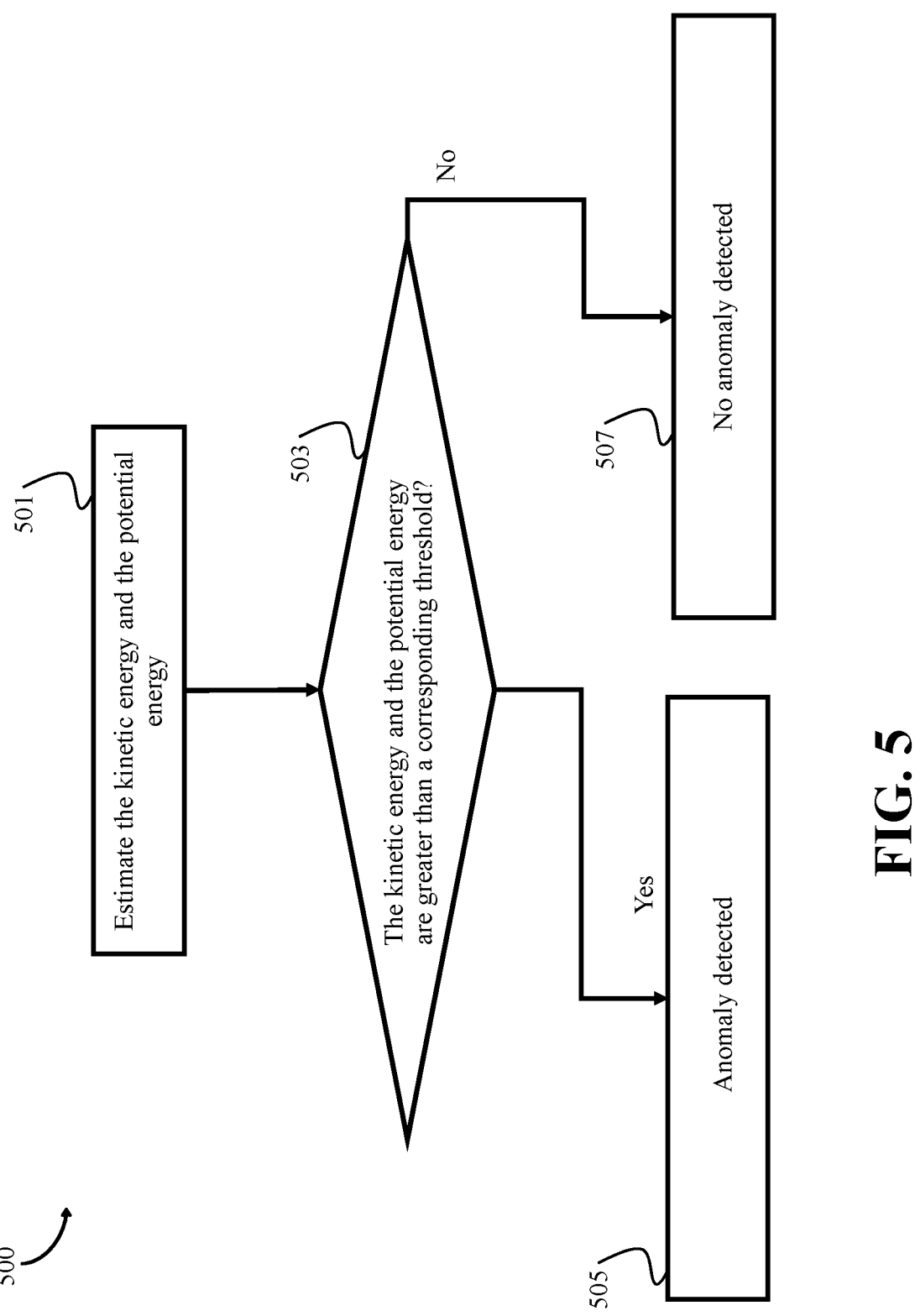
FIG. 5 illustrates a flow diagram of a method for anomaly detection based on the estimated kinetic energy and the potential energy of the mechanical system, according to some embodiments of the present disclosure.

FIG. 5 illustrates a flow diagram of a method 500 for an anomaly detection based on the estimated kinetic energy and the estimated potential energy of the mechanical system 109, according to some embodiments of the present disclosure.

At block 501, the processor 103 is configured to estimate the kinetic energy and the potential energy of the mechanical system 109, as described above in FIG. 4A and FIG. 4B.

Further, the processor 103 is configured to compare the estimated kinetic energy and the estimated potential energy with a corresponding threshold. In other words, the processor 103 is configured to compare the estimated kinetic energy with a first threshold and compare the estimated potential energy with a second threshold. Based on such comparison, the anomaly is detected. For instance, at block 503, the processor 103 is configured to check if the estimated kinetic energy and the estimated potential energy are greater than the corresponding threshold. If the estimated kinetic energy and the estimated potential energy are greater than the first threshold and the second threshold, respectively, then, at block 505, it is inferred that the anomaly is detected. If the estimated kinetic energy and the estimated potential energy are not greater than the first threshold and the second threshold, respectively, then, at block 507, it is inferred that no anomaly is detected.

Alternatively, in some embodiments, the processor 103 is configured to check if the estimated kinetic energy and the estimated potential energy are less than the first threshold and the second threshold, respectively. If the estimated kinetic energy and the estimated potential energy are less than the first threshold and the second threshold, respectively, then it is inferred that the anomaly is detected. If the estimated kinetic energy and the estimated potential energy are not less than the first threshold and the second threshold, respectively, then it is inferred that no anomaly is detected. If the estimated kinetic energy is greater than the first threshold and the estimated potential energy is less than the second threshold, then a fault detection is inferred as a special case of anomaly detection depending only on potential energy faults. If the estimated potential energy is greater than the second threshold and the estimated kinetic energy is less than the first threshold, then a fault detection is inferred as a special case of anomaly detection depending only on kinetic energy faults.

Additionally, in some embodiments, the estimated potential energy and the estimated kinetic energy are used to adjust the control commands for the mechanical system 109. For instance, based on the estimated potential energy and the estimated kinetic energy, a passivity controller can be designed to control the mechanical system 109. The passivity controllers are effective to control mechanical systems but require precise models of the energies to define Hamiltonian or Lagrangian of the mechanical system 109. Some embodiments can estimate accurate models of the energies that result in accurate passivity controllers.

In some other embodiments, a trajectory for performing a task is tracked based on the estimated inverse dynamics. For instance, the processor 103 is configured to determine, based on the torques that are output of the inverse dynamics model, a controller that can track a trajectory to execute a task. The task may be an assembly operation, a polishing operation, or a pick and place operation.

Additionally, in an embodiment, the processor 103 is further configured to determine, based on the estimated kinetic energy and the estimated potential energy, a motion plan that consumes a minimum amount of energy for performing the task. The motion plan may include a trajectory for performing the task. Such an embodiment is described below in FIG. 6.

Figure 6:
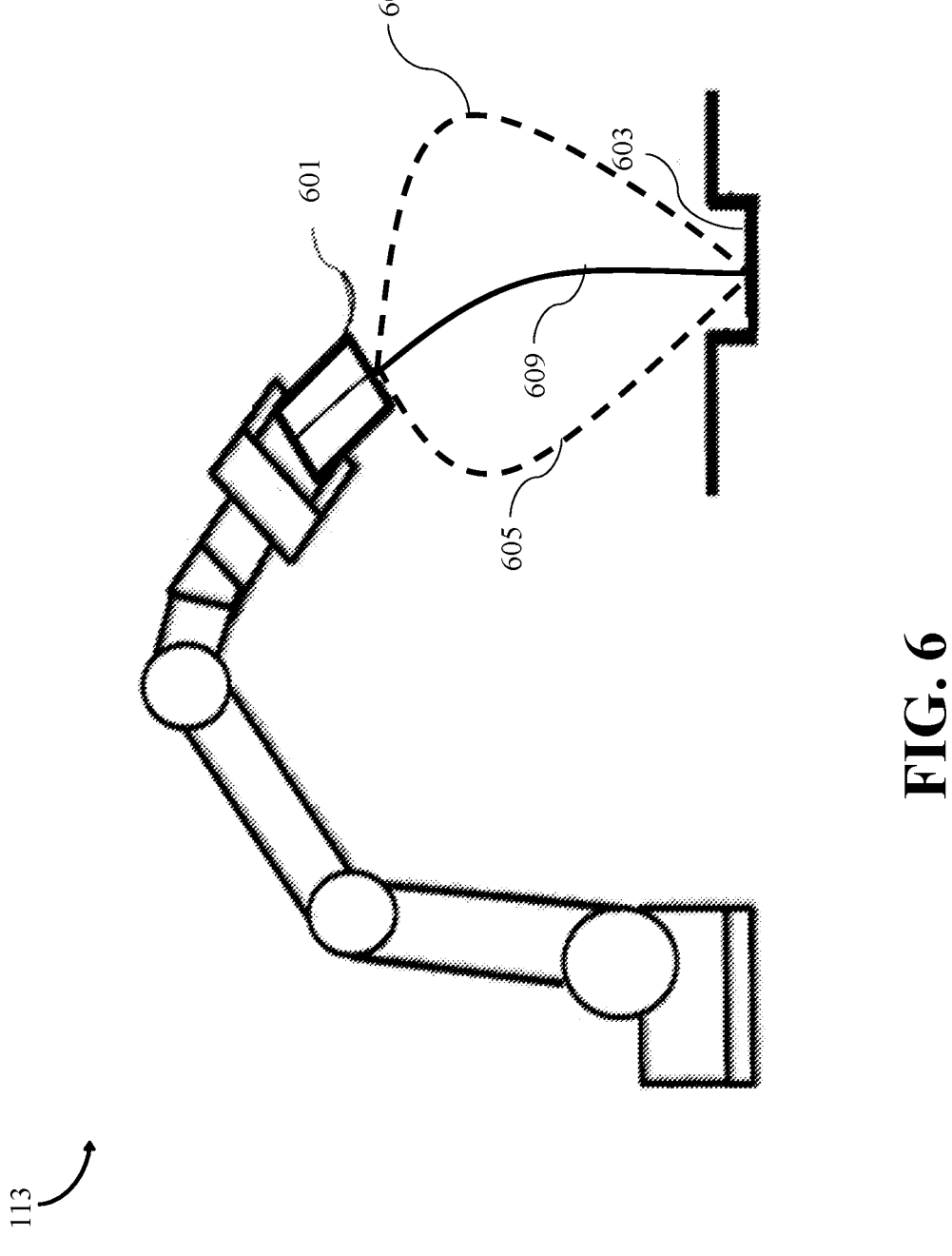
FIG. 6 illustrates a motion plan that consumes a minimum amount of energy for performing a task, according to some embodiments of the present disclosure.

FIG. 6 illustrates a motion plan 609 that consumes a minimum amount of energy for performing the task by the robotic manipulator 113, according to some embodiments of the present disclosure. The motion plan 609 is a trajectory to be tracked by the robotic manipulator 113 for performing the task. It is an object of some embodiments to configure the robotic manipulator 113 to perform a task of inserting an object 601 in a hole 603. A motion plan is to be determined for the robotic manipulator 113 to perform the task. Different motion plans, such as a motion plan 605 and a motion plan 607, may be determined for performing the task. However, it is desired to determine a motion plan that consumes the minimum amount of energy for performing the task. The processor 103 is configured to determine, based on the estimated kinetic energy and the estimated potential energy, the motion plan 609 that consumes the minimum amount of energy for performing the task. Further, the processor 103 is configured to control the robotic manipulator 113 according to the motion plan 609 to perform the task by consuming the minimum amount of energy. For example, based on the motion plan 609, the processor 103 is configured to determine control commands for the different actuators of the robotic manipulator 113. The control commands are applied to the different actuators of the robotic manipulator 113. The control commands cause the robotic manipulator 113 to track the motion plan 609 for performing the task.

Figure 7:
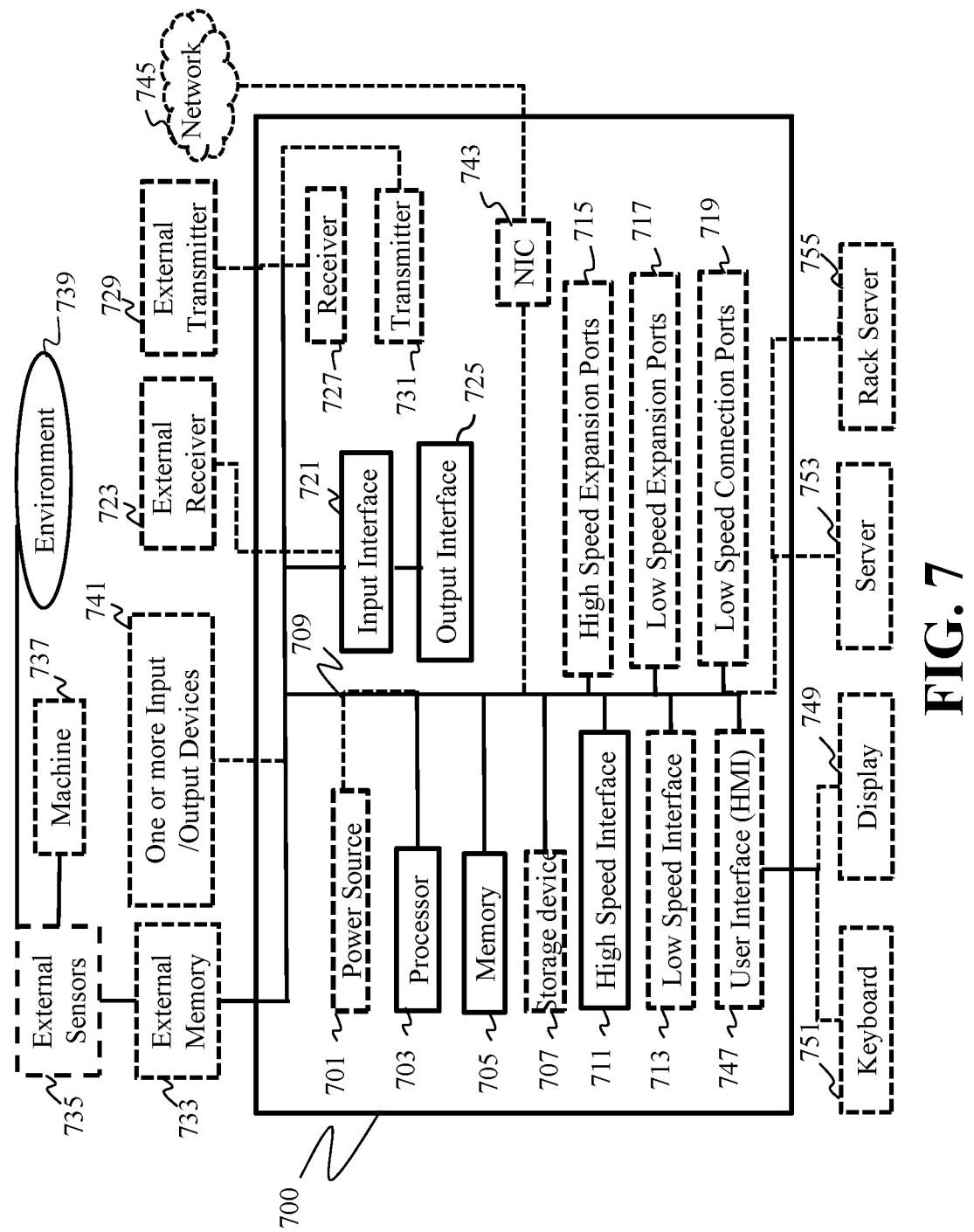
FIG. 7 is a schematic illustrating a computing device for implementing the controller and methods of the present disclosure.

FIG. 7 is a schematic illustrating a computing device 700 for implementing the controller 101 and methods of the present disclosure. The computing device 700 includes a power source 701, a processor 703, a memory 705, a storage device 707, all connected to a bus 709. Further, a high-speed interface 711, a low-speed interface 713, high-speed expansion ports 715 and low speed connection ports 717, can be connected to the bus 709. In addition, a low-speed expansion port 719 is in connection with the bus 709. Further, an input interface 721 can be connected via the bus 709 to an external receiver 723 and an output interface 725. A receiver 727 can be connected to an external transmitter 729 and a transmitter 731 via the bus 709. Also connected to the bus 709 can be an external memory 733, external sensors 735, machine(s) 737, and an environment 739. Further, one or more external input/output devices 741 can be connected to the bus 709. A network interface controller (NIC) 743 can be adapted to connect through the bus 709 to a network 745, wherein data or other data, among other things, can be rendered on a third-party display device, third party imaging device, and/or third-party printing device outside of the computer device 700.

The memory 705 can store instructions that are executable by the computer device 700 and any data that can be utilized by the methods and systems of the present disclosure. The memory 705 can include random access memory (RAM), read only memory (ROM), flash memory, or any other suitable memory systems. The memory 705 can be a volatile memory unit or units, and/or a non-volatile memory unit or units. The memory 705 may also be another form of computer-readable medium, such as a magnetic or optical disk.

The storage device 707 can be adapted to store supplementary data and/or software modules used by the computer device 700. The storage device 707 can include a hard drive, an optical drive, a thumb-drive, an array of drives, or any combinations thereof. Further, the storage device 707 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 703), perform one or more methods, such as those described above.

The computing device 700 can be linked through the bus 709, optionally, to a display interface or user Interface (HMI) 747 adapted to connect the computing device 700 to a display device 749 and a keyboard 751, wherein the display device 749 can include a computer monitor, camera, television, projector, or mobile device, among others. In some implementations, the computer device 700 may include a printer interface to connect to a printing device, wherein the printing device can include a liquid inkjet printer, solid ink printer, large-scale commercial printer, thermal printer, UV printer, or dye-sublimation printer, among others.

The high-speed interface 711 manages bandwidth-intensive operations for the computing device 700, while the low-speed interface 713 manages lower bandwidth-intensive operations. Such an allocation of functions is an example only. In some implementations, the high-speed interface 711 can be coupled to the memory 705, the user interface (HMI) 747, and to the keyboard 751 and the display 749 (e.g., through a graphics processor or accelerator), and to the high-speed expansion ports 715, which may accept various expansion cards via the bus 709. In an implementation, the low-speed interface 713 is coupled to the storage device 707 and the low-speed expansion ports 717, via the bus 709. The low-speed expansion ports 717, which may include various communication ports (e.g., USB, Bluetooth, Ethernet, wireless Ethernet) may be coupled to the one or more input/output devices 741. The computing device 700 may be connected to a server 753 and a rack server 755. The computing device 700 may be implemented in several different forms. For example, the computing device 700 may be implemented as part of the rack server 755.

The present disclosure provides the controller 101 that is configured to control the mechanical system 109 using the inverse dynamics model 107. The inverse dynamics model 107 models the energy of the mechanical system 109. Modeling the energy captures mutual effects of the torques of the different actuators on each other. Thereby, the inverse dynamics model 107 enables accurate controlling of the mechanical system 101. Additionally, the formulation of the inverse dynamics model 107 requires minimum physical information about the mechanical system 109. To that end, the formulation of the inverse dynamics model 107 is simpler. Additionally or alternatively, the inverse dynamics model 107 can be used to estimate the kinetic energy of the mechanical system 109 and the potential energy of the mechanical system 109.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship with each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

The invention claimed is:

1. A controller for controlling a mechanical system having different actuators and multiple degrees of freedom to track a reference trajectory for performing a task, comprising:
a memory configured to store an energy based inverse dynamics model trained with machine learning to map states of the different actuators to corresponding torques for the different actuators, wherein the energy based inverse dynamics model is configured to model energy of the mechanical system with a Gaussian Processes having a covariance matrix capturing correlations between the torques of the different actuators, and wherein the covariance matrix is a full matrix including non-zero elements; and
a processor configured to:
process the states of the different actuators with the energy based inverse dynamics model to produce values of the torques for the different actuators of the mechanical system; and
control the mechanical system based on the produced values of the torques for the different actuators of the mechanical system.

2. The controller of claim 1, wherein the energy based inverse dynamics model is defined by a Lagrangian polynomial kernel that is based on at least: a Lagrangian operator, a kernel function of kinetic energy of the mechanical system, and a kernel function of potential energy of the mechanical system.

3. The controller of claim 2, wherein the Lagrangian operator is defined based on a set of partial differential equations.

4. The controller of claim 3, wherein the Lagrangian operator maps a Lagrangian function of the mechanical system to the torques of the different actuators.

5. The controller of claim 4, wherein the Lagrangian function is defined based on a difference between the kinetic energy of the mechanical system and the potential energy of the mechanical system.

6. The controller of claim 2, wherein the kernel function of the kinetic energy of the mechanical system is a polynomial function in a space defined by a trigonometric transformation of the state of the mechanical system.

7. The controller of claim 2, wherein the kernel function of the potential energy of the mechanical system is a polynomial function in a space defined by a trigonometric transformation of the state of the mechanical system.

8. The controller of claim 2, wherein one or more hyperparameters of the Lagrangian polynomial kernel are learned based on a machine learning algorithm, the machine learning algorithm using maximization of marginal likelihood.

9. The controller of claim 1, wherein the energy based inverse dynamics model is a multi-input-multi-output (MIMO) torque estimator model that produces torques for the different actuators based on positions of multiple joints of the mechanical system, and velocity and acceleration of the multiple degrees of freedom.

10. The controller of claim 2, wherein the processor is further configured to process the states of the different actuators with the energy based inverse dynamics model to estimate potential energy of the mechanical system and kinetic energy of the mechanical system.

11. The controller of claim 10, wherein the processor is further configured to compare the estimated kinetic energy and the estimated potential energy with a corresponding threshold.

12. The controller of claim 11, wherein the processor is further configured to detect an anomaly of the mechanical system based on the comparison of the estimated kinetic energy and the estimated potential energy with the corresponding threshold.

13. The controller of claim 10, wherein the processor is further configured to determine, based on the estimated kinetic energy and the estimated potential energy, a motion plan that consumes a minimum amount of energy for performing the task.

14. A method for controlling a mechanical system having different actuators and multiple degrees of freedom to track a reference trajectory for performing a task, wherein the method uses a processor coupled to a memory storing an energy based inverse dynamics model trained with machine learning to map states of the different actuators to corresponding torques for the different actuators, wherein the energy based inverse dynamics model is configured to model energy of the mechanical system with a Gaussian Processes Regression (GPR) process having a covariance matrix capturing correlations between the torques of the different actuators, and wherein the covariance matrix is a full matrix including non-zero elements, the processor is coupled with stored instructions when executed by the processor carry out steps of the method, comprising:
processing the states of the different actuators with the energy based inverse dynamics model to produce values of the torques for the different actuators of the mechanical system; and
controlling the mechanical system based on the produced values of the torques for the different actuators of the mechanical system.

15. The method of claim 14, wherein the energy based inverse dynamics model is defined by a Lagrangian polynomial kernel that is based on at least: a Lagrangian operator, a kernel function of kinetic energy of the mechanical system, and a kernel function of potential energy of the mechanical system.

16. The method of claim 15, wherein the Lagrangian operator is defined based on a set of partial differential equations.

17. The method of claim 15, wherein the Lagrangian operator maps a Lagrangian function of the mechanical system to the torques of the different actuators.

18. The method of claim 16, wherein the Lagrangian function is defined based on a difference between the kinetic energy of the mechanical system and the potential energy of the mechanical system.

19. The method of claim 15, wherein the kernel function of the kinetic energy of the mechanical system is a polynomial function in a space defined by a trigonometric transformation of the state of the mechanical system.

20. The method of claim 15, wherein one or more hyperparameters of the Lagrangian polynomial kernel are learned based on a machine learning algorithm, the machine learning algorithm using maximization of marginal likelihood.

21. A non-transitory computer readable storage medium embodied thereon a program executable by a processor for performing a method for controlling a mechanical system having different actuators and multiple degrees of freedom to track a reference trajectory for performing a task, the storage medium stores an energy based inverse dynamics model trained with machine learning to map states of the different actuators to corresponding torques for the different actuators, wherein the energy based inverse dynamics model is configured to model energy of the mechanical system with a Gaussian Processes Regression (GPR) process having a covariance matrix capturing correlations between the torques of the different actuators, and wherein the covariance matrix is a full matrix including non-zero elements, the program when executed by the processor carry out steps of the method, comprising:

processing the states of the different actuators with the energy based inverse dynamics model to produce values of the torques for the different actuators of the mechanical system; and controlling the mechanical system based on the produced values of the torques for the different actuators of the mechanical system.

* * * * *